March 20, 1951

A. J. HUCK ET AL 2,545,662

THERMAL CONTROL

Filed Dec. 3, 1949

Inventors:
Alfred J. Huck
Charles D. Visos
By Bair & Freeman Attys.

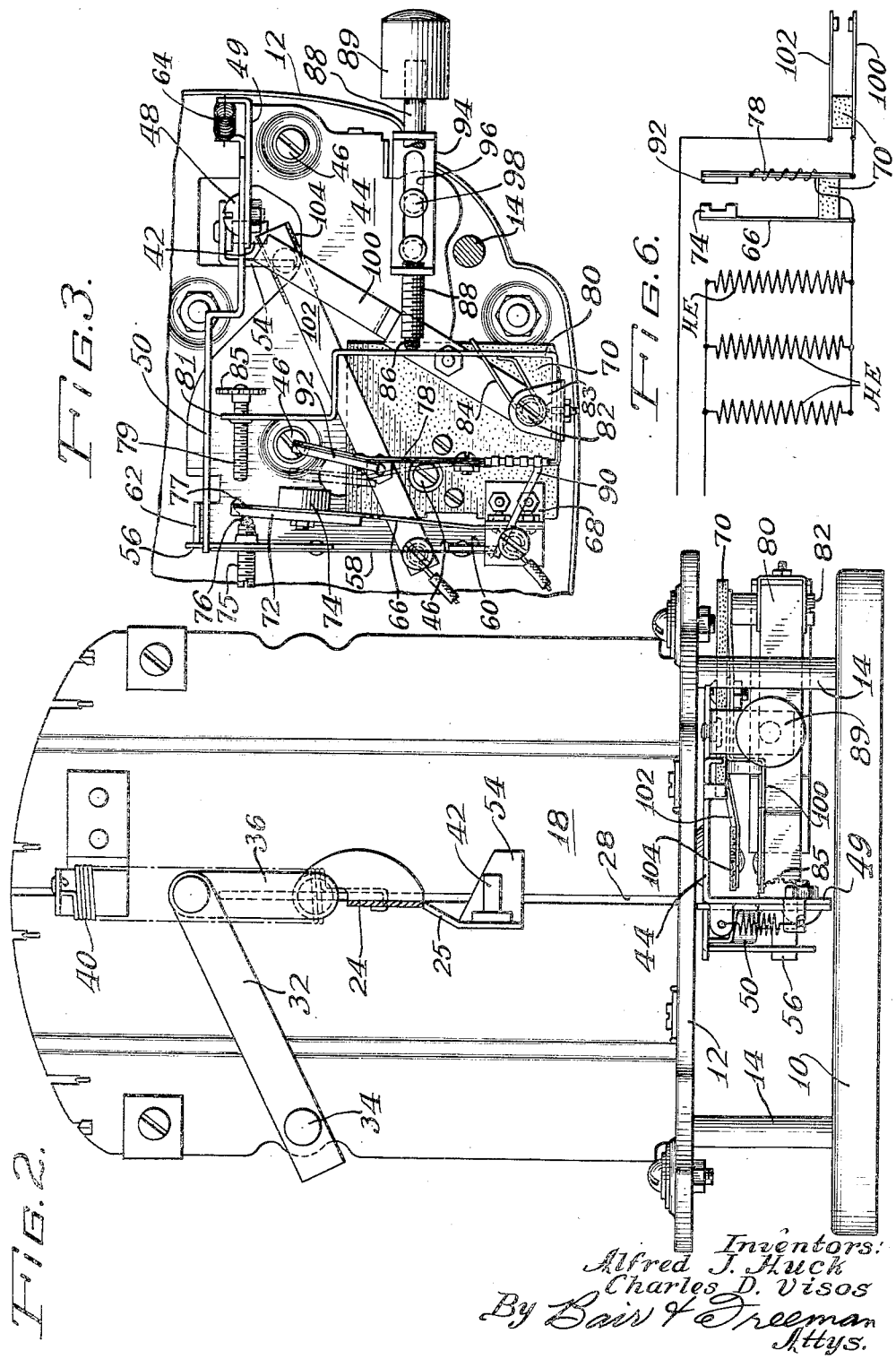

March 20, 1951     A. J. HUCK ET AL     2,545,662
THERMAL CONTROL

Filed Dec. 3, 1949     3 Sheets-Sheet 3

Inventors:
Alfred J. Huck
Charles D. Visos
By Bair & Freeman
Attys.

Patented Mar. 20, 1951

2,545,662

UNITED STATES PATENT OFFICE 2,545,662

THERMAL CONTROL

Alfred J. Huck and Charles D. Visos, St. Louis, Mo., assignors to Knapp-Monarch Company, St. Louis, Mo., a corporation of Delaware Application December 3, 1949, Serial No. 131,007

11 Claims. (Cl. 171—97)

This invention relates to a control device of the thermally-operated type adaptable for use in connection with toasters and the like in which control device a single thermally responsive element is heated by energization of a heating element therefor and warps to a heat-up limit whereupon the circuit is conditioned for deenergization of the heating element to permit the thermally responsive element to return to a cool-off limit at which limit it causes actuation of means to perform a control function such as the termination of the operating cycle of a toaster or other appliance.

One object of the invention is to provide a control device which operates on the heat-up, cool-down principle of the Fry et al. Patent No. 1,746,827, issued February 11, 1930, and disclosing a retarded action circuit controller adaptable for thermally controlling toasters as well as operating as a retarded action relay, the present invention contemplating a mechanical impact means to utilize the final movement of the thermally responsive member after heat-up and cool-down to perform a control function without the necessity of energizing a relay to do so, such control function being for example the release of a bread carrier and the opening of a main switch for the heating elements of a toaster as specifically disclosed in the present application.

Another object is to provide a heat-up, cool-down type of control mechanism for controlling an electrical appliance which includes an element of bimetal or the like responsive to the heat of a heating element for moving in one direction, magnetic means being provided for attracting an impact release spring thereto whereupon the circuit to the heating element is rendered ineffective to heat the bimetal element further so that it cools down and carries along with it the impact release spring, a cool-down limit being established where the movement of the spring is interrupted so that the further cooling down of the bimetal element disconnects the spring therefrom whereupon the stored-up energy in the spring returns it to an initial position and effects the release of a latch from an arm latched thereby due to such movement aided by the impact resulting from the mass of the spring plus the parts carried thereby, the unlatched arm effecting the release of a bread carrier and opening contacts for another circuit such as the heating element circuit of the appliance or performing other control functions.

Still another object is to provide a control structure which is extremely simple to manufacture and adjust, which is not critical as to the operating time in respect to the movement of the bimetal element and which for the control of a bread toaster involves only five basic functional parts, to-wit: the control bimetal, its heater, the impact release spring, the bracket for carrying the control bimetal, and the main switch for the heating elements of the toaster.

A further object is to provide an arrangement of the parts enumerated such that the bimetal, when heated, warps to a position where a pair of magnetic elements such as an armature and a magnet mutually attract each other, the magnetic elements serving as contacts for shunting out the heater for the bimetal so that it then cools, the impact release spring carrying one of said magnetic elements and the bimetal carrying the other, the impact release spring being stopped in its movement (resulting from cool-down of the bimetal) by the bracket whereupon further movement of the bimetal causes it to overcome the magnetic attraction and pull away from the spring, thus releasing the stored-up energy therein so that it will swing back to a latch releasing position due to such stored-up energy aided by the impact caused by the weight of the magnet and other parts attached to the spring, and the bracket being adjustable for changing the timing and effecting manual release before automatic release if desired.

With these and other objects in view, our invention consists in the construction, arrangement and combination of the various parts of our Thermal Control, whereby the objects contemplated are attained, as hereinafter more fully set forth, pointed out in our claims and illustrated in the accompanying drawings, wherein:

Figure 2 is a right hand end elevation of Figure 1.

Figure 3 is a bottom plan view of our control device per se and a portion of the toaster base to which it is mounted, the parts being shown in the position assumed when the bread carrier is first depressed and at the beginning of the heat-up portion of the control cycle.

Figure 6 is an electrodiagrammatic view showing the circuit and switching arrangement for the toaster.

Figure 1:
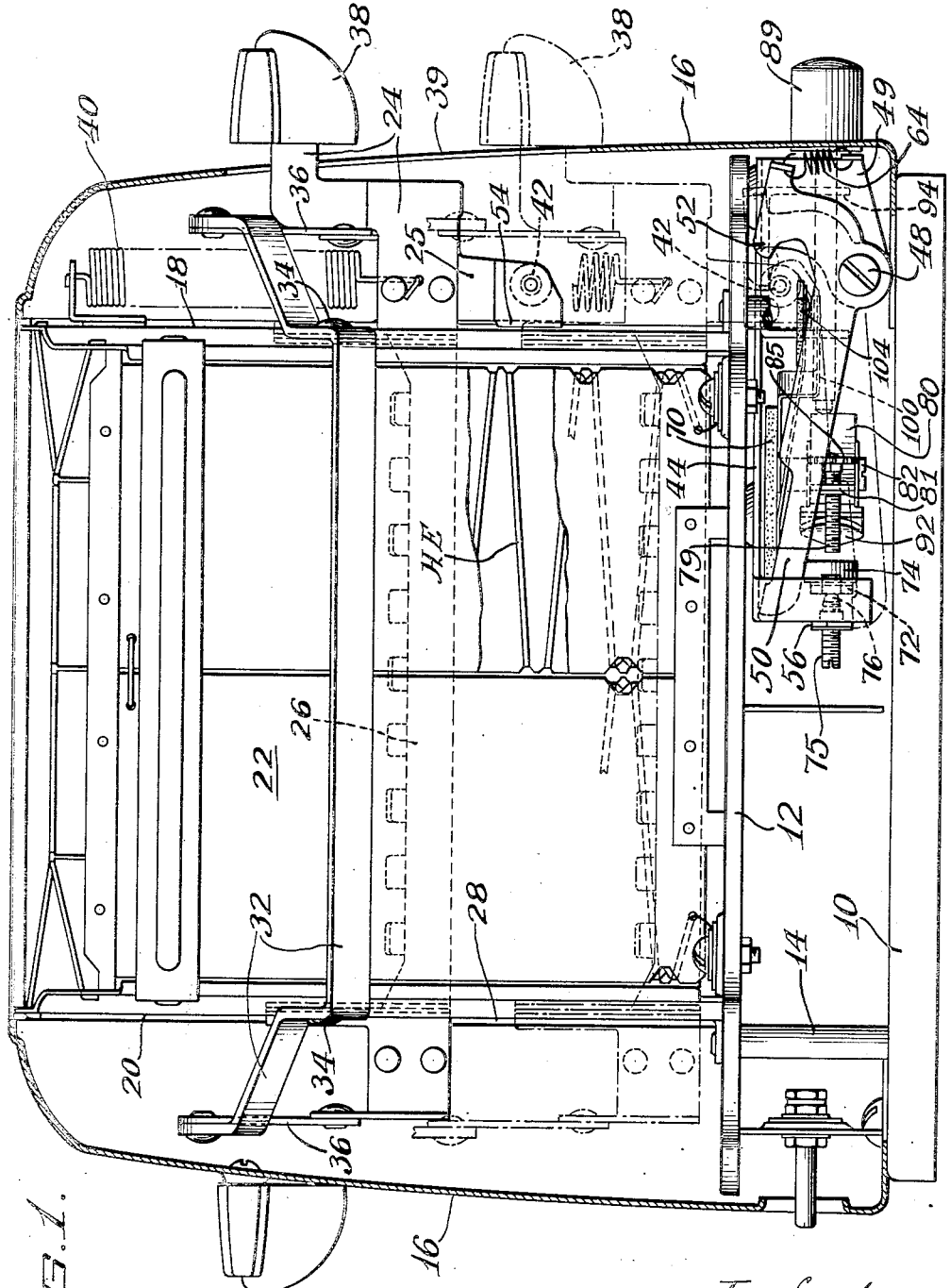
Figure 1 is a vertical sectional view through an electric bread toaster showing a side elevation of the toasting chamber with one of the heating elements adjacent thereto, and in the base of the toaster showing a control embodying our present invention.

On the accompanying drawings we have used the reference numeral 10 to indicate a base above which a sub-base 12 is supported on posts or the like 14. A toasting compartment is provided above the sub-base 12 enclosed by a casing 16 in the usual manner. The toasting compartment has front and rear walls 18 and 20 and side walls 22. The usual heating elements HE are provided, a portion of one of which is shown in Figure 1 and the elements being shown diagrammatically in Figure 6.

A bread carrier is provided consisting of a bar 24 carrying the usual bread supports 26, two of which are usually provided in toasters of this character so that two slices of bread can be toasted at the same time. The bar 24 and the carriers 26 are vertically movable, the bar being guided by slots 28 in the front and rear walls 18 and 20, and the ends of the bar and thereby the carriers being maintained level by a U-shaped arm 32 pivoted at 34 to the end walls 18 and 20 and connected by links 36 with the ends of the bar.

For depressing the bread carrier, a knob 38 is provided and where the bar 24 extends to the knob 38, it passes through a slot 39 in the casing 16 to permit the desired vertical movement of the bar. The bread carriers are normally maintained in the raised position by a return spring 40 and are to be retained at times in the lowered position by a latch arrangement which coacts with a pin 42 projecting from an extension 25 of the arm 24.

Our control device comprises a mounting plate 44 secured to the bottom of the sub-base 12 as by three screws 46. A latch arm 50 is pivoted at 48 to a downwardly extending ear 49 of the plate 44. The latch arm has a hook 52 adapted to be moved from the solid line position of Figure 1 to the dotted line position therein over the pin 42 in its dotted position as a result of a flange 54 on the bracket 25 engaging the upper edge of the latch arm 50 and rotating it counterclockwise in Figure 1 above the pivot 48. The outer end of the latch arm 50 (left end in Figures 1 and 3) engages a latch 56 which is mounted by means of a spring 58 on an ear 60 extending from the mounting plate 44. The latch 56 is moved to the left by the latch arm 50 in Figure 3 away from a stop ear 62 and the arm latches under the edge of the latch 56 after the arm passes this edge, as shown by the dot-and-dash line position in Figure 1. The bread carrier is thereby latched in the lowered position against the tendency of the spring 40 to raise it.

The normal position of the latch arm 50 is shown by solid lines in Figure 1 which position is the result of a biasing spring 64. An impact release spring is provided for the latch 56 comprising a spring blade 66 connected to a bracket 68 of the mounting plate 44 and insulated therefrom by a rectangular piece of insulation 70. The spring 66 carries a bar 72 and a small permanent magnet 74. The bar 72 is adapted to strike a ceramic insert 76 in an adjusting screw 75 carried by the latch 56. The bar 72 also has a V-point 77 adapted to strike an adjusting screw 79 for a purpose which will hereinafter appear. The screw 79 is threaded in a bracket 80 and has a head 85 for convenience in changing the adjustment.

We provide a temperature controlled bimetal 78 mounted on the bracket 80, the bracket in turn has ears 83 pivoted at 82 and biased by a spring 84 against an insulating button 86 of an adjusting screw 88. A heater for the bimetal 78 is provided at 90 in the form of a resistance ribbon wound thereon and insulated therefrom. The bimetal 78 also carries an armature 92 for cooperation with the magnet 74 as will hereinafter appear.

The adjusting screw 88 is carried by a U-shaped bracket 94 which is slidably mounted by means of a slot and rivet connection to the mounting plate 44 and illustrated at 96—98. The bracket 94 is constrained to the position of Figures 3 and 4 by the spring 84.

A main switch is provided comprising switch blades 100 and 102 mounted on the insulation 70, their contacts being normally separated from each other as shown in Figure 2. When the flange 54 engages an insulating strip 104 on the blade 102 however, as a result of depressing the bread carrier to the dotted position shown in Figure 1, the contacts are closed and are then retained closed by the latch arm 50 in the dot-and-dash line position of Figure 1.

*Practical operation*

When the bread carriers 26 are lowered by lowering the bar 24, the latch arm 50 engages with the latch 56 and the main switch 100—102 is closed by the flange 54 engaging the insulation 104 to energize the heating elements HE of the toaster and also the heater 90 for the bimetal element 78 as obvious from an inspection of Figure 6. Since the heater 90 is in series with the heating elements HE, as the heating elements heat up the heater 90 also heats and warps the bimetal 78 to the position shown by dot-and-dash lines in Figure 3 whereupon the armature 92 is close enough to the magnet 74 to attract the magnet to itself against the bias of the impact release spring 66 supporting the magnet.

Figure 4:
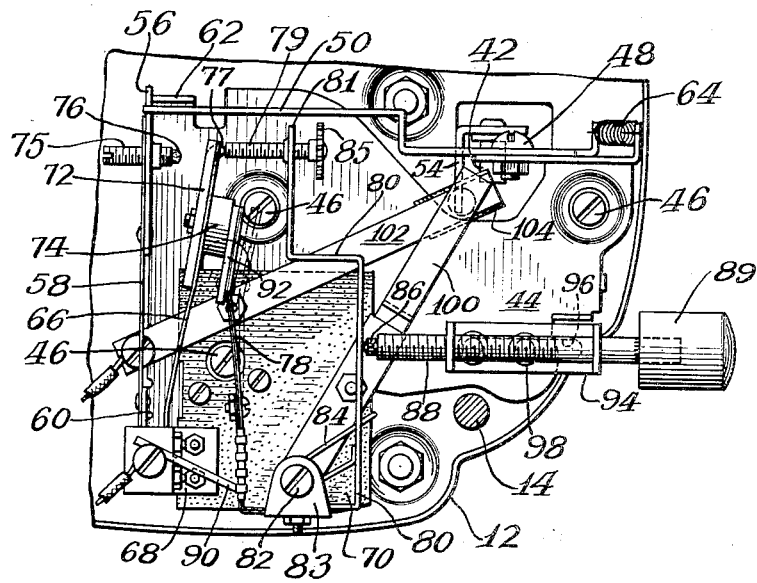
Figure 4 is a similar view showing the parts at the end of the cool-down cycle.

The magnet 74 and the armature 92 constitute contacts in the electric circuit. Their engagement with each other shunts out the heater 90 so that it is no longer effective to heat the bimetal 78. Accordingly, the bimetal cools down and in so doing warps back toward its initial position taking along with it the magnet 74 as shown by solid lines in Figure 4. During this cool-down movement, the V-point 77 engages and is restrained by the end of the adjusting screw 79 of the bracket 80 as shown in Figure 4 but the movement of the armature 92 is not so restrained and accordingly pulls away from the magnet 74. This occurs before the bimetal has fully cooled so it can keep on warping as to the dotted position in Figure 4.

When the armature pulls away from the magnet the stored-up energy in the impact release spring 66 causes it to straighten out and carry with it the bar 72 which strikes the insert 76 of latch 56 and releases it under the action of the spring 66 aided by the mass of the parts 72 and 74 carried by the spring. Thus stored-up energy is accumulated and finally released so as to mechanically operate the latch 56 in a very simple manner aided by impact so that critical adjustment is unnecessary as where a bimetal element serves as a latch and gradually moves off the end of the latch arm in which case friction loads are involved which vary the release moment in relation to temperature to a considerable degree in successive cycles. On the other hand, our arrangement is such that energy is stored up and the release of that energy is also at substantially the same release point unaffected by changes in frictional loads. Full advantage is taken of impact to release the latch from the latch arm without having to contend with variations caused by friction.

It is also noted that a bimetal has been selected that has considerable throw during its operating cycle so that critical operating points are spread out thus making the overall operation less needful of critical dimensioning and in effect magnifying the motions produced so that average manufacturing tolerances are permissible, the bimetal movement being large enough to permit visual gap settings by mechanical measurement.

The gap between the magnet and the armature determines the heat-up time and the gap between the V-point 77 of the bar 72 and the adjusting screw 79 of the bracket 80 determines the cool-down time. The screw 88 may accordingly be adjusted (a knob 89 being provided for this purpose) for serving as a "color adjustment" for the toaster. The adjustment of this screw swings the entire bracket 80 and the bimetal 78 around the pivot 82 to lengthen the heat-up gap as well as the cool-down gap for longer control cycles and vice versa.

We have designed our toaster so that both a heat-up adjustment and a cool-down adjustment are had. The heat-up adjustment is external to the toaster housing. By simply pulling off the color control knob 89 (splined to the shaft at 87 with relatively fine splining so that there can be only a few degrees adjustment if desired) the knob can be replaced in a desired position for lighter or darker toast with the desired medium color of toast substantially half way between the limits of movement of the knob 89 which would be slightly less than a full turn. The front panel 16 of the toaster is usually provided with indicia such as "dark," "medium" and "light," whereas the knob would have an indicating element thereon such as a white dot indicated at 91 to cooperate therewith in the indication of the desired color. This adjustment changes the gap between the armature 92 and the magnet 74 and also between the adjusting screw 79 and the V-point 77 so that both the heat-up gap and the cool-down gap are thereby adjusted. The cool-down gap may then be additionally adjusted in relation to the heat-up gap by rotating the knob 85 on the adjusting screw 79.

Figure 5:
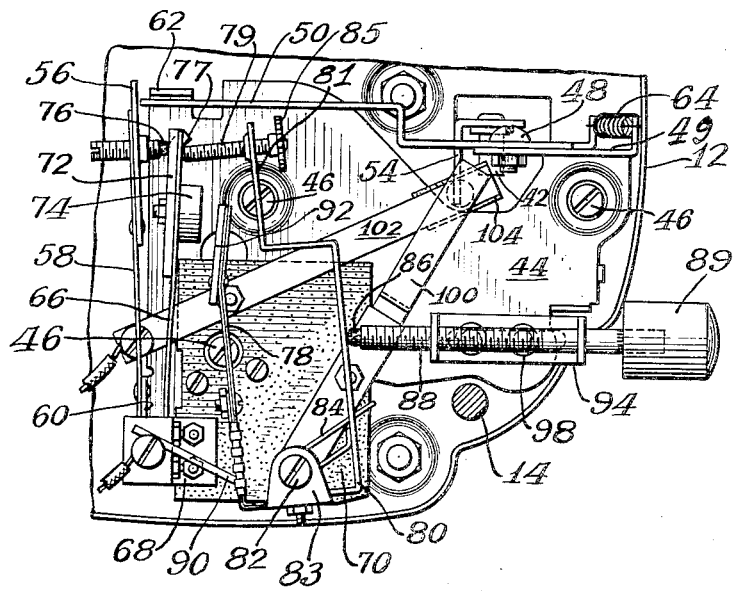
Figure 5 is a similar view showing the operation of the manual release.

The arrangement disclosed also provides for manual release of the latch 56 from the latch arm 50 when desired by merely pushing in on the knob 89 as shown in Figure 5 which causes the adjusting screw 79 to contact the V-point 77 and the bar 72 to thereafter contact the insert 76 in the latched position of Figure 3 and move the latch 56 to the position of Figure 5 thus effecting manual release of the latch. At all times the spring 84 tends to keep the bracket 80 against the button 86 of the adjusting screw 88 and returns the screw and its mounting bracket 94 to the position of Figure 3 when the operator's finger is removed from the knob 89.

Most thermal controls have a tendency to provide a lighter color of toast at low voltage. Repeated tests with our control have, however, produced lighter color at lower voltage which is a decided improvement in the control characteristics of a toaster, securing much better compensation for ambient temperature rise of the toaster itself. After many repeated tests at all different adjustments, the toaster can be reset for medium color and will not show a noticeable change in the color of the toast. This we attribute to the less critical adjustments above referred to which makes visual gap adjustment entirely practical without the necessity of having to run actual bread toasting tests to determine that the adjustment is correct. This makes our toaster much more economical to manufacture.

From the foregoing specification it will be obvious that we have provided a comparatively simple control structure involving but few parts for performing a control function such as to release a bread carrier and open main heating element contacts in a bread toaster wherein the control device utilizes the heat-up, cool-down principle. With our arrangement the termination of the cool-down portion of the cycle results in mechanical release of the impact release spring in which tension has been stored up by the slow movement of the bimetal from the heat-up to the cool-down position and upon release the spring aided by impact provides a simple mechanical means to perform a control function such as to release a latch from a latch arm.

Some changes may be made in the construction and arrangement of the parts of our thermal control without departing from the real spirit and purpose of our invention, and it is our intention to cover by our claims any modified forms of structure or use of mechanical equivalents which may be reasonably included within their scope.

We claim as our invention:

1. In a thermal control of the character disclosed, a bimetal control element, a heater therefor, a latch arm, a latch therefor, said latch arm being adapted to close a circuit for said heater when moved to latched position and terminate a control function when said latch is unlatched therefrom, an impact release spring, a pair of magnetic elements, one carried by said bimetal and the other carried by said impact release spring and positioned relative to each other so that the bimetal when heated will cause its magnetic element to approach the magnetic element of the impact release spring until the elements are mutually attracted, means for rendering said heater for said bimetal inoperative when said magnetic elements are so attracted whereby the bimetal can cool down and carry with it the impact release spring, means to stop the movement of the impact release spring at a cool-down point of the bimetal whereupon further cool-down movement thereof will separate said magnetic elements, said impact release spring being positioned to thereupon engage said latch by the return movement of the spring and the impact thereof against said latch to unlatch it from said latch arm.

2. In a thermal control of the character disclosed, a bimetal control element, a heater therefor, a latch arm, a latch therefor, said latch arm being adapted to close a circuit for said heater when moved to latched position and terminate a control function when said latch is unlatched therefrom, an impact release spring, a pair magnetic elements positioned relative to each other so that the bimetal when heated will cause one magnetic element to approach the other magnetic element until the elements are mutually attracted, means for rendering said heater for said bimetal inoperative when said magnetic elements are so attracted whereby the bimetal can cool down and carry with it the impact release spring, means to stop the movement of the impact release spring at a cool-down point of the bimetal whereupon further cool-down movement thereof will separate said magnetic elements, said impact release spring being positioned to thereupon engage said latch by the return movement of the spring and the impact thereof against said latch to unlatch it from said latch arm.

3. In a thermal control of the character disclosed, a bimetal control element, a heater therefor, a latch arm, a latch therefor, said latch arm being adapted to close a circuit for said heater when moved to latched position and terminate a control function when said latch is unlatched therefrom, an impact release spring, a pair of magnetic elements, one for said bimetal and the other for said impact release spring and positioned relative to each other so that the bimetal when heated will cause its magnetic element to approach the magnetic element of the impact release spring until the elements are mutually attracted, means for rendering said heater for said bimetal inoperative when said magnetic elements are so attracted whereby the bimetal can cool down and carry with it the impact release spring, means to stop the movement of the impact release spring at a cool-down point of the bimetal whereupon further cool-down movement thereof will separate said magnetic elements, said impact release spring being positioned to thereupon engage said latch by the return movement of the spring and the impact thereof against said latch to unlatch it from said latch arm.

4. In a thermal control, a control element slowly movable in response to heat, an electric heater therefor, an arm adapted to perform a control function when moved to a latched position and to terminate such control function when unlatched, a latch for said arm, an impact release spring for said latch, a pair of magnetic elements, one carried by said control element and the other carried by said impact release spring and positioned relative to each other so that the control element when heated will move its magnetic element to a position adjacent the magnetic element of said impact release spring until the magnetic elements are mutually attracted, means for de-energizing said heater when said magnetic elements are so attracted whereby the control element can cool down and carry with it the impact release spring, a stop for said impact release spring at a cool-down point of the control element where further cool-down movement thereof will separate said magnetic elements, said impact release spring being positioned to thereupon engage said latch to unlatch it from said arm, a pivoted bracket on which said control element is mounted, and an adjusting screw for said bracket to move said control closer to or farther from said impact release spring.

5. In a thermal control of the character disclosed, a bimetal control element, a heater therefor, a latch arm, a latch therefor, said latch arm being adapted to close a circuit for said heater when moved to latched position and terminate a control function when said latch is unlatched therefrom, an impact release spring, a pair of magnetic elements, one carried by said bimetal and the other carried by said impact release spring and positioned relative to each other so that the bimetal when heated will cause its magnetic element to approach the magnetic element of the impact release spring until the elements are mutually attracted, means for rendering said heater for said bimetal inoperative when said magnetic elements are so attracted whereby the bimetal can cool down and carry with it the impact release spring, means to stop the movement of the impact release spring at a cool-down point of the bimetal whereupon further cool-down movement thereof will separate said magnetic elements, said impact release spring being positioned to thereupon engage said latch by the return movement of the spring and the impact thereof against said latch unlatches it from said latch arm, a bracket on which said bimetal is mounted, and means for adjusting said bracket to move the bimetal element closer to or farther from the impact release spring, said bracket constituting the stop means for said impact release spring whereby movement of the bracket adjusts the heat-up travel of the release spring.

6. A thermal control of the character disclosed comprising a bimetal, a heater therefor, a latch arm, a latch therefor, an impact release spring for said latch, magnetic elements carried by said bimetal and said spring and adapted to be attracted to each other when the bimetal warps in response to heat from said heater, said magnetic elements shunting said heater for carrying the current normally flowing to it when said magnetic elements are in contact whereby to permit said bimetal to cool and carry with it said release spring, a bracket pivotally mounted, said bimetal being carried by said bracket, and an adjusting screw for said bracket, said impact release spring being engageable with said bracket to limit the cool-down movement of the spring and separate said magnetic elements as a result of further cool-down, said release spring thereupon moving toward its initial position as a result of the stored-up energy therein and engaging said latch with impact due to the mass of the magnetic element carried thereby.

7. A thermal control comprising a control element which moves slowly in response to heat, an electric heater therefor, a control arm, a latch therefor, an impact release spring for said latch, magnetic elements carried by said control element and said spring adapted to be attracted to each other when the control element moves in response to heat, said magnetic elements shunting said heater for carrying the current normally flowing to it when said magnetic elements are in contact whereby to permit said control element to cool and carry with it said release spring, a bracket, said control element being carried by said bracket, said impact release spring being engageable with said bracket to limit the cool-down movement of the spring and separate said magnetic elements upon further cool-down of said control element, said release spring thereupon moving toward its initial position as a result of the stored-up energy therein and engaging said latch to unlatch it from said control arm.

8. A thermal control of the character disclosed comprising a bimetal, a heater therefor, a latch arm, a latch therefor, an impact release spring for said latch, magnetic elements carried by said bimetal and said spring and adapted to be attracted to each other when the bimetal warps in response to heat from said heater, said magnetic elements shunting said heater for carrying the current normally flowing to it when said magnetic elements are in contact whereby to permit said bimetal to cool and carry with it said release spring, a bracket pivotally mounted, said bimetal being carried by said bracket, an adjusting screw for said bracket, said impact release spring being engageable with said bracket to limit the cool-down movement of the spring and separate said magnetic elements as a result of further cool-down, said release spring thereupon moving toward its initial position as a result of the stored-up energy therein and engaging said latch with impact due to the mass of the magnetic element carried thereby, said adjusting screw being slidably mounted for swinging said bracket and thereby manually releasing said latch by means of the bracket engaging said extension and causing the impact release spring to move said latch to unlatched position.

9. A thermally-operated control device for performing a control function a temperature-controlled interval after its operation is initiated comprising an actuating element movable in response to temperature rise, an electric heater therefor, a control arm, a latch for said control arm, said control arm being latched by initiation of operation of said control device, an impact release spring for said latch, magnetic elements carried by said actuating element and said spring for mutual attraction upon movement of said actuating element a predetermined distance in response to heating of said electric heater, a switch to energize said electric heater when said control arm is latched, engagement of said magnetic elements establishing a circuit to effect de-energization of said electric heater whereby said actuating element is permitted to cool and moves in an opposite direction carrying with it said impact release spring, and means for stopping the movement of said spring as said actuating element continues to move, said spring thereupon returning to its initial position and engaging said latch with impact as it does so to effect unlatching of said latch from said control arm.

10. In a thermal control, a control element slowly movable in response to heat, an electric heater therefor, an arm adapted to perform a control function when moved to a latched position and to terminate such control function when unlatched, a latch for said arm, an impact release spring for said latch, a pair of magnetic elements, one carried by said control element and the other carried by said impact release spring and positioned relative to each other so that the control element when heated will move its magnetic element to a position adjacent the magnetic element of said impact release spring until the magnetic elements are mutually attracted, means for de-energizing said heater when said magnetic elements are so attracted whereby said control element can cool down and carry with it said impact release spring, and a stop for said impact release spring at a cool-down point of said control element where further cool-down movement thereof will separate said magnetic elements, said impact release spring being positioned to thereupon engage said latch to unlatch it from said arm.

11. A thermal control comprising a bimetal element slowly movable in response to heat, an electric heater therefor, a control arm, a latch therefor when said control arm is in position for causing operation of a device controlled thereby, said control arm, when said latch is unlatched therefrom, terminating the operation of the device, an impact release spring, a pair of magnetic elements, one carried by said bimetal element and the other carried by said impact release spring approaching each other until they are mutually attracted, said magnetic elements being electrically connected with the ends of said electric heater whereby to shunt it out of the circuit energizing it for de-energizing said heater whereby said bimetal element can cool down and carry with it the impact release spring, a stop for the movement of said impact release spring at a cool-down point of said bimetal element whereupon further cool-down movement thereof will separate said magnetic elements, said impact release spring thereupon unlatching said latch from said control arm by the return movement of the spring and the impact thereof against the latch aided by the momentum of the magnetic element carried thereby.

ALFRED J. HUCK.
CHARLES D. VISOS.

No references cited.